United States Patent

[11] 3,628,813

[72] Inventors Henry L. Lee, Jr.
745 Sierra Madre Blvd., San Marino, Calif. 91108;
Gordon W. Culp, 12802 Collins St., North Hollywood, Calif. 91607
[21] Appl. No. 44,849
[22] Filed June 9, 1970
[45] Patented Dec. 21, 1971

[54] FLUID CONNECTING DEVICE
11 Claims, 6 Drawing Figs.

[52] U.S. Cl. .................................................. 285/31,
128/214 R, 128/334 C, 128/348, 285/61, 285/260, 285/364, 285/131
[51] Int. Cl. .................................................. F16l 31/00, A61m 05/00
[50] Field of Search .................................. 285/31, 61, 260, 325; 128/214 R, 334 C, 348-351

[56] References Cited
UNITED STATES PATENTS
1,517,544  12/1924  Draver ........................  285/31
3,456,965  7/1969  Gajewski et al. ...............  285/260
3,482,574  12/1969  Stoever et al. ................  128/214 R
3,484,121  12/1969  Quinton .......................  285/242

OTHER REFERENCES
Quinton et al., Trans. Amer. Soc. Artific. Inter. Organs Vol. VIII 1962, pp. 236– 243

Primary Examiner—Dalton L. Truluck
Attorney—Irons, Stockman, Sears & Santorelli

ABSTRACT: A fluid connecting device particularly adapted for use in connection with hemodialysis operations to permit repeated access to the blood system of chronic hemodialysis patients. The device comprises a pair of tube elements and a base structure adapted for rigidly mounting the tube elements in spaced relationship. A compressible, resilient, elongated conduit member is compressed between the tube elements, to normally intercommunicate the same. When hemodialysis is required, the conduit member can be removed from the device utilizing only one hand and replaced by a similar member providing inlet and outlet connections for the hemodialysis operation.

INVENTORS
HENRY L. LEE, JR.,
GORDON W. CULP

BY *Irons, Stockman, Sears & Santorelli*
ATTORNEYS

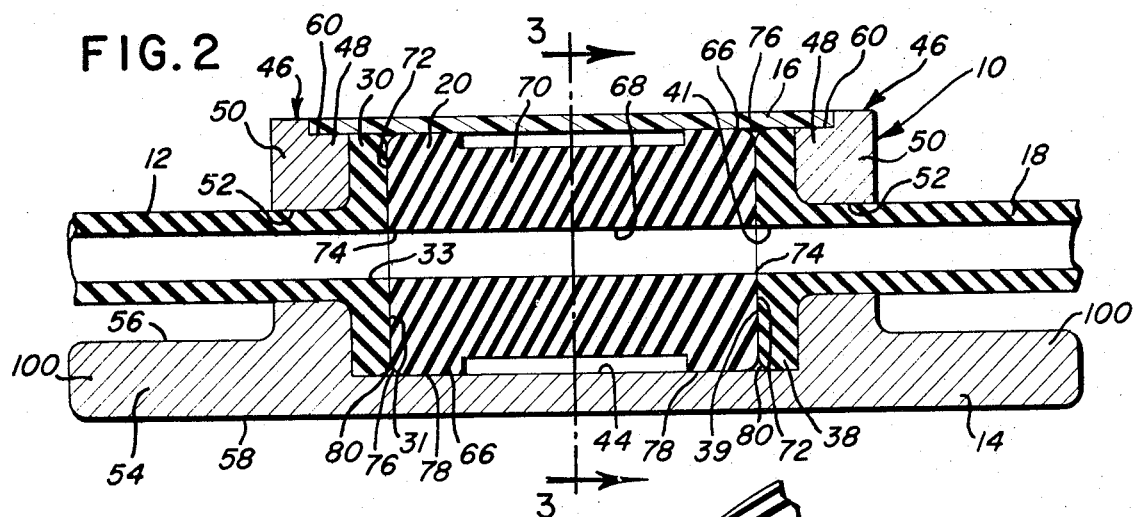
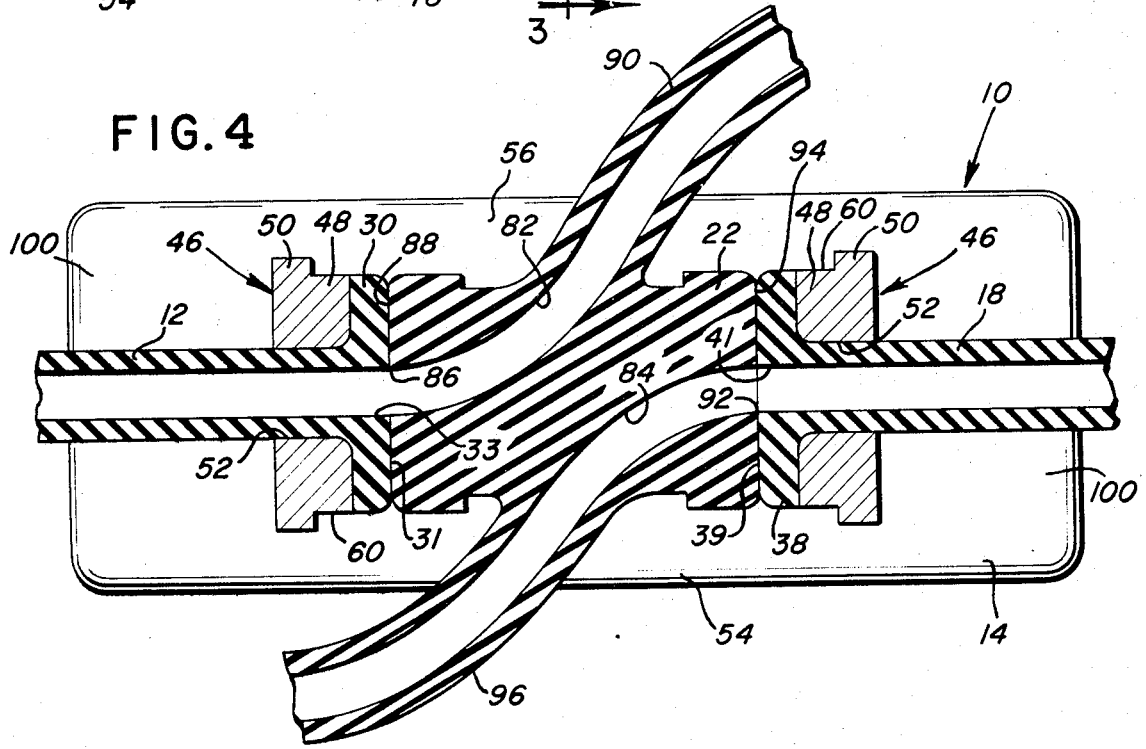
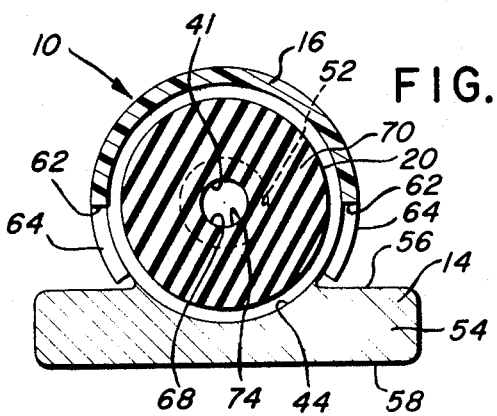

INVENTORS
HENRY L. LEE, JR.,
GORDON W. CULP

BY Irons, Stockman, Sears & Santorelli
ATTORNEYS

FLUID CONNECTING DEVICE

The invention described herein was made in the course of work under a grant or award from the Department of Health, Education and Welfare.

BACKGROUND OF THE INVENTION

1. Field of the Invention

The present invention relates to fluid connecting devices and particularly to connecting devices useful in connection with blood-handling procedures such as hemodialysis or the like.

2. Description of the Prior Art

The principal shortcoming of the connectors which are presently used for hemodialysis is that they require at least two hands to perform the various operations involved in connecting the patient to the heparin purge and hemodialysis equipment. The patient, thus, is dependent on assistance for this repeated, life-giving service. This fact reinforces the feeling of psychological dependency which is frequently encountered among chronic dialysis patients. It is believed that freeing such a patient from absolute reliance on others by permitting him to perform all necessary steps in connection with the actual dialysis will result in more rapid rehabilitation and increased mental health. The need for such independence becomes more important as the number of patients on home dialysis increases and the dependency becomes increasingly family oriented.

SUMMARY OF THE INVENTION

Accordingly, it is the primary and principal object of the present invention to provide a fluid connecting device adapted for making the various connections necessary to facilitate the operations involved in hemodialysis, which device can be operated by the patient himself, without outside assistance, and with only a single hand.

Further, and more particularly, it is an object of the instant invention to provide such a fluid connecting device wherein the device has hemodynamic characteristics which minimize-clotting tendencies and hemolysis due to turbulent blood flow. Further, it is the purpose of the invention to provide a fluid connecting device of the type described wherein the device has a low profile, is light weight, low cost, includes protective safety features and has no moving parts.

The various prior art problems have been essentially and substantially solved through the use of a fluid connecting device constructed in accordance with the present invention. This device comprises a pair of elongated tube elements, each of which has a positioning flange at one end and means at the opposite end for facilitating connection of the element to a remote liquid flow system. Each of the flanges has a generally planar surface facing away from its corresponding tube element, there being a hole in each surface extending inwardly through the flange and communicating with the interior of the tube element. The tube elements are carried by an elongated base structure which rigidly mounts the flanges with their surfaces disposed in spaced, facing, generally parallel relationship presenting an elongated space extending therebetween.

A conduit member is disposed in the space. The conduit member has a pair of opposed, generally planar, generally parallel faces, one at each end thereof, and it includes fluid passageway defining means presenting an opening at each of its faces. The base structure includes means engaging the conduit member and positioning the same in the space with its face each engaging a corresponding surface and with its openings disposed in fluid communication with corresponding holes. The conduit member is constructed with its faces initially spaced apart a distance slightly greater than the length of the space, said member being longitudinally compressible and resilient whereby the faces of the member are resiliently urged into tight frictional engagement with corresponding surfaces.

Generally, a second conduit member interchangeable with the first-mentioned conduit member is provided. The passageway defining means of one of the conduit members defines a single passageway extending through the member and intercommunicating its openings. The other conduit member includes a pair of laterally extending conduit branches and the passageway defining means of that member defines a separate branch passageway for each opening. Each of these branch passageways connects one of the openings of the member with a respective one of the branches and the branch passageways are out of fluid communication internally of the member. Thus, connection to hemodialysis equipment, for example, can be performed merely by exchanging conduit members in the device.

BRIEF DESCRIPTION OF THE DRAWINGS

FIG. 2 is an enlarged, vertical, longitudinal, cross-sectional view of the fluid connecting device;

FIG. 3 is a vertical, transverse, cross-sectional view of the device taken substantially along line 3—3 of FIG. 2;

FIG. 4 is a horizontal, longitudinal, cross-sectional view illustrating the device wherein a branching conduit member has been exchanged for the straight through conduit member;

DESCRIPTION OF THE PREFERRED EMBODIMENT

Figure 1:
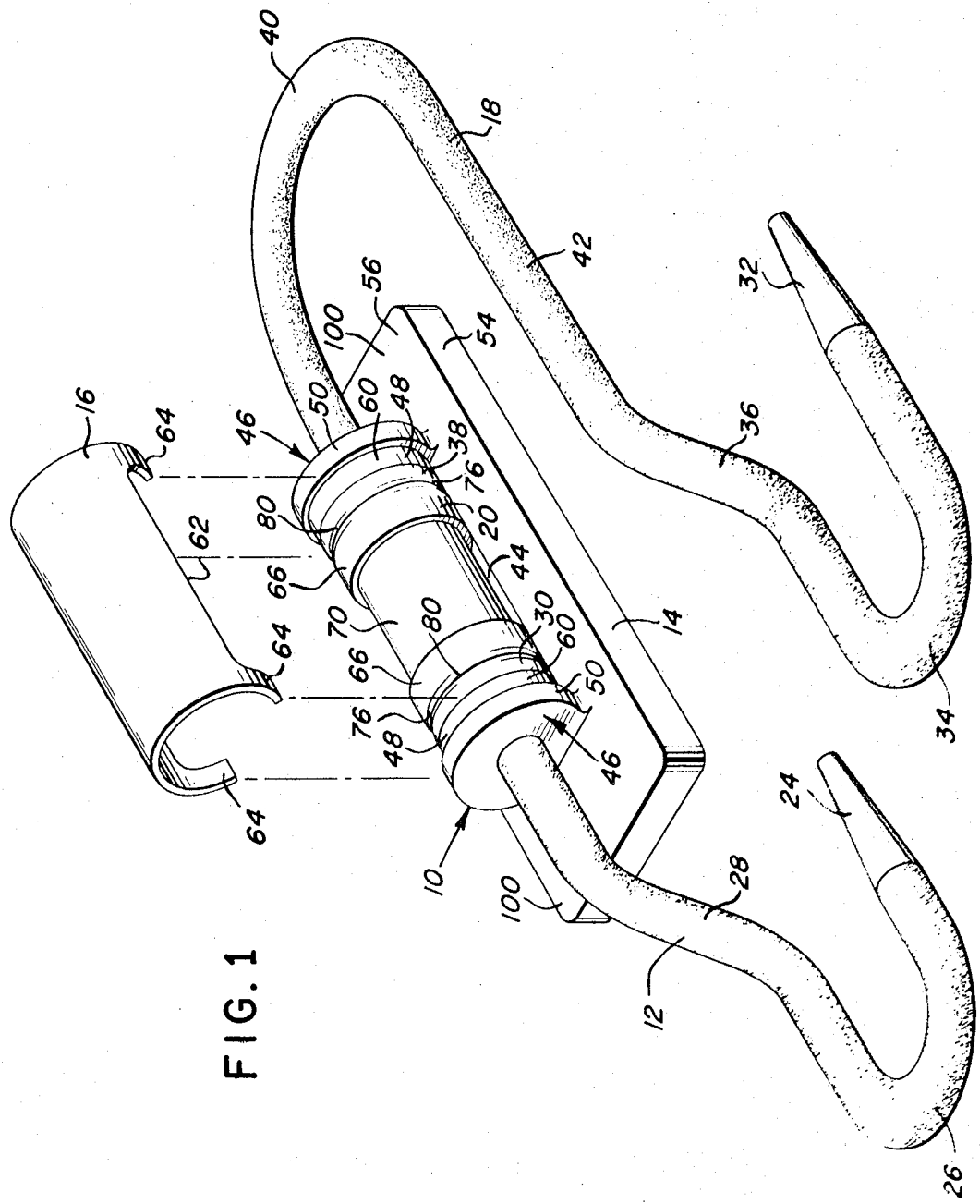
FIG. 1 is a partially exploded, perspective view of a fluid connecting device which embodies the principles and concepts of the instant invention.

A fluid connecting device embodying the principles and concepts of the instant invention is illustrated in the drawings and is broadly designated by the numeral 10. Device 10 is operable for connecting and disconnecting fluid-carrying members. In particular, device 10 is useful in connection with cannuli for transportation of blood outside of the body and return of the same to the body.

Figure 5:
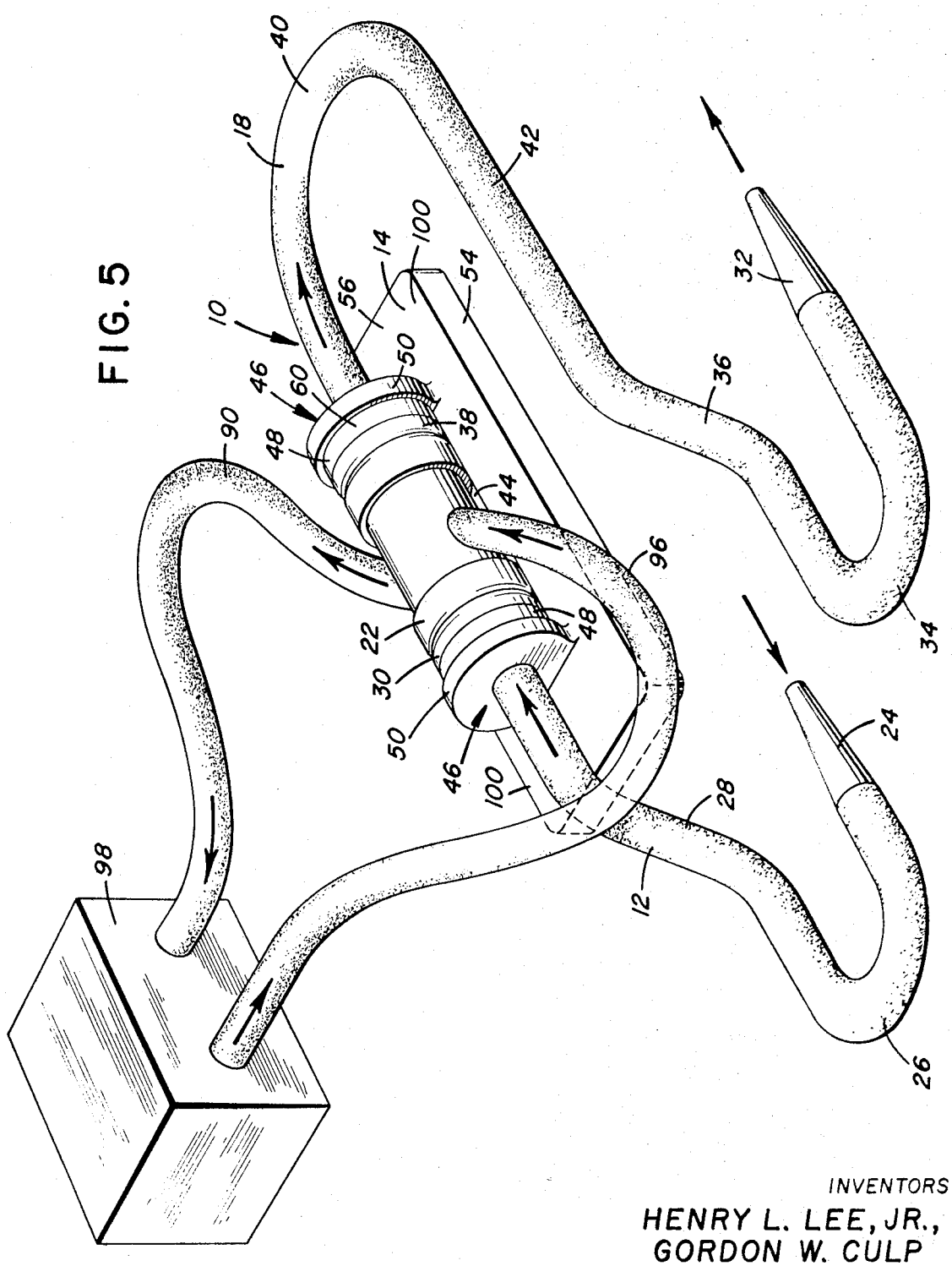
FIG. 5 is a perspective view similar to FIG. 1 except that a branching conduit member has been exchanged for the straight through conduit member and the device is illustrated as providing connection to an external device such as hemodialysis apparatus.
Figure 6:
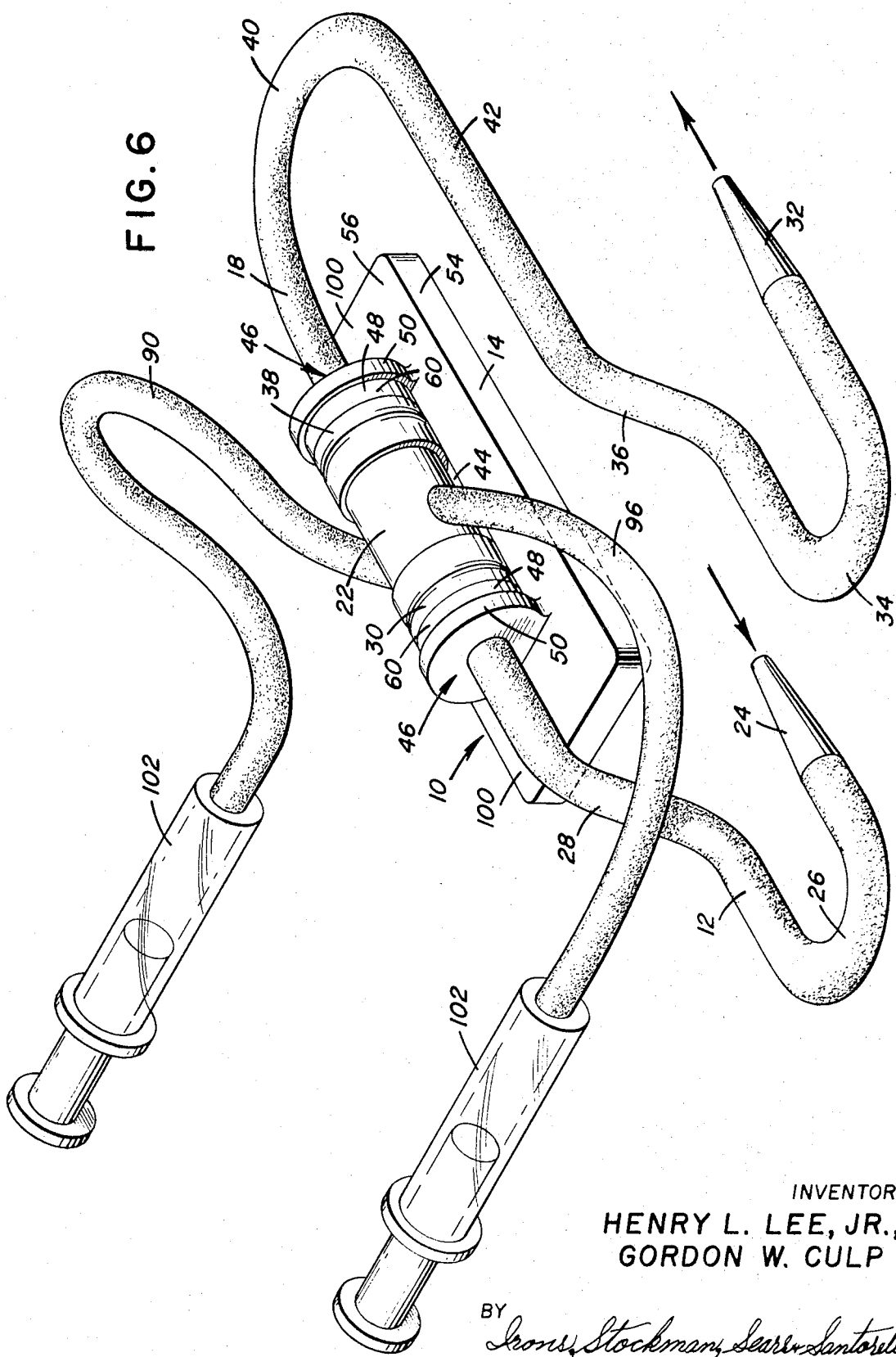
FIG. 6 is a perspective view similar to FIG. 5 except that the fluid connecting device is illustrated as providing connection to heparin purge syringes.

Device 10 comprises five major components. These are an inlet tube element 12, a base structure 14, a cover 16, an outlet tube element 18 and a conduit member which may be either a straight through conduit member 20 as illustrated in FIGS. 1, 2 and 3 or a branching or diverting conduit member 22 as illustrated in FIGS. 4, 5 and 6.

Inlet tube element 12 is elongated and provides for the passage of fluid from a fluid source to the interior of device 10 by way of a coupling 24, through 180° bend 26, through an S-bend 28, and thence through a positioning flange 30 of tube element 12. Flange 30 has a generally planar surface 31 facing away from tube element 12. A hole 33 extends inwardly from surface 31 through flange 30 and communicates with the interior of tube element 12. Flange 30 is preferably constructed of a compressible material having a hardness within the approximate range of 35 to 90 on the Shore A scale, a typical value being about 75 Shore A. Flange 30 is attached to inlet tube element 12 which may be made of the same material in which case inlet tube element 12 and flange 30 may be made at the same time from the same piece of material. On the other hand, it should be appreciated that tube element 12, and flange 30 could be constructed of different materials. Coupling 24 provides means facilitating connection of element 12 to a remote liquid flow system and should preferably be made of a material with a different hardness of the Shore A scale in the approximate range of 35 to 90, a typical value being about 85.

Typical materials for the construction of inlet tube element 12 are TFE Teflon as made by the Du Pont Company, Silastic brand medical silicone rubber as made by Dow Chemical Company and segmented polyurethane rubber. These same materials are also preferred for coupling 24 and flange 30 of inlet tube element 12.

For the application, for example, where device 10 is used for connection to blood vessels in vertebrate animals, S-bend 28 of tube element 12 may be located in a hole in the skin of the animal in such a way that the portion of tube element 12 between S-bend 28 and flange 30 is located outside the animal, whereas 180° bend 26 and coupling 24 are located inside the animal in a position within and adjacent to its skin. Coupling 24 is preferably provided with a taper along its length and has its smallest diameter at its free end, this end thus being positionable within the interior of some tissue, member, organ, or fluid channel, in such manner that the fluid residing in and flowing therethrough may flow into coupling 24, the direction of such flow being in the direction of flange 30 when the pressure decreases in that direction. Typically, coupling 24 may be positioned in an artery of the animal such that blood flows from the artery, through coupling 234, thence through inlet tube element 12, and then into the interior of device 10, in that order.

Outlet tube element 18 is constructed in substantially the same manner as inlet tube element 12 including an outlet coupling 32, a 180° bend 34, an S-bend 36 and a positioning flange 38. Flange 38 has a planar surface 39 and a hole 41 which correspond with surface 31 and hole 33 of flange 30. Tube element 18 may be constructed of the same materials as tube element 12 and has all the features of inlet tube element 12 except that it is longer and includes an additional 180° bend 40. The additional length 42 and additional 180° bend 40 are located between flange 38 and S-bend 36 in such manner as to allow positioning of coupling 32 and S-bend 36 of outlet tube element 18 adjacent to S-bend 28 and coupling 24 of inlet tube element 12. Typically, outlet coupling 32 will be located in a vein in such manner that blood flows therefrom and into the vein.

Base structures 14 may preferably be constructed of a rigid material, typical materials being nickel alloy, epoxy, fiber-reinforced epoxy, rigid polyurethane, or other rigid polymers. Base structure 14 may be machined from one piece, or conversely may be constructed by machining three or more separate pieces which are subsequently bonded or otherwise attached together. Alternatively, base structure 14 may be made by casting, molding, or otherwise plastic forming, using molds, dies, or forming tools. Base structure 14 preferably has a centrally located cylindrical cavity 44 which is bounded at each end by a respective boss structure 46, boss structures 46 being attached to the base structure 14 or being an integral part thereof.

Each boss structure 46 includes an internal boss 48 and an external boss 50. Each boss 48, as seen from inside cylindrical cavity 44, is circular and has a centrally located hole 52 extending therethrough, holes 52 each being coaxial with the longitudinal axis of cylindrical cavity 44 and each having an inside diameter which is approximately equal to the outside diameter of the tube elements 12 and 18. The outside diameter of bosses 48 should be approximately equal to the outside diameter of flanges 30 and 38. The diameter of each external boss 50 should preferably be slightly greater than the diameter of bosses 48. The diameter of cylindrical cavity 44 should also be approximately equal to the outside diameter of flanges 30 and 38.

Tube elements 12 and 18 extend through a respective one of holes 52 with flanges 30 and 38 abutting respective bosses 48. Thus, flanges 30 and 38 and thereby elements 12 and 18 are rigidly mounted on base structure 14 with surfaces 31 and 39 disposed in spaced, facing, generally parallel relationship presenting an elongated space extending therebetween.

Base structure 14 includes a lower, generally rectangular pedestal 54 which has an upper surface 56 disposed in a plane which is generally parallel to the axis of cylindrical cavity 44. However, the plane of surface 56 is located approximately midway between the axis of cylindrical cavity 44 and flat bottom 58 of base structure 14 and passes through cylindrical cavity 44 below said axis, such disposition resulting in boss 48 having an exposed cylindrical surface 60 that extends from upper surface 56 on one side of boss 48 to the same surface 56 on the opposite side of boss 48. Thus, the exposed cylindrical surface 60 of boss 48 extends through more than one-half circle but less than one whole circle. Also, it is to be noted that the transverse cross-sectional configuration of cavity 44 presents a segment of a circle.

Cover 16 generally has semicylindrical configuration and is manufactured in such a way that its outside diameter is equal to the outside diameter of boss 50 and its inside diameter is equal to the outside diameter of boss 48. The length of cover 16 approximately coincides with the distance between bosses 50. Cover 16 is preferably constructed in such manner as to comprise a portion of a cylinder having a circumferential dimension approximately equal to the extent of the exposed cylindrical surface 60 of boss 48. That is to say, cover 16 is constructed to extend from surface 56 on one side of cavity 44 to surface 56 on the opposite side of cavity 44. Portions of the cylindrical wall of cover 16 are removed in two locations, in equal amounts, one at each edge of the partial cylinder, to form two identical, but mirror image cavities 62, each cavity 62 being bounded near the ends of the cover by clasping legs 64. The distance between the upper surface 56 of base 14 and the upper boundary of each cavity 62 being approximately equal to the distance from surface 56 to the axis of cavity 44, whereby the removal of cover 16 from base 14 is possible without substantial interference between cover 16 and conduit element 20. Cover 16 is preferably made of a resilient material having sufficient elastic properties such that return to original configuration after slight deformation is assured.

Cover 16 may be constructed of transparent material to allow visualization therewithin. Typical materials of manufacture for cover 16 includes polycarbonate resins, acrylic resins, and polystyrene resins. The construction of cover 16 is such that it comprises an arc greater than one-half of a circle. Further, the distance between the feet 64 on opposite sides of cover 16 is less than the outside diameter of bosses 48 of the base structure 14. This requires that feet 64 of cover 17 be spread outward by the camming action of surfaces 60 during the installation of cover 16. Thus, since cover 16 is constructed of resilient material, a snap-in-place mechanism is formed to retain cover 16 in its proper position on base structure 14 between bosses 50 thereof. This minimizes the possibility of dislodgement of cover 16 from base structure 14, by accidental impact. In like manner, when cover 16 is removed from base structure 14 by application of prying force using a suitable instrument in either cavity 62 or cover 16, feet 64 are cammed outward by the contact between the inner surfaces of feet 64 and the outer exposed cylindrical surface 60 of boss 48 until cover 16 is nearly completely removed. Thereafter, the elasticity of the material from which cover 16 is made causes cover 16 to return to its original configuration.

Straight through conduit member 20 is elongated, is generally round in transverse cross-sectional configuration and has a generally cylindrical shape, the end portions 66 thereof having an outside diameter approximately equal to the outside diameter of bosses 48 of base structure 14. Fluid passageway defining means within member 20 present a single centrally located passageway 68 which extends longitudinally through member 20, passageway 68 being coaxially aligned with member 20. A central portion 70 of member 20 has a diameter that is less than the diameter of boss 48 of base structure 14. Planar end faces 72 of member 20 lie in generally parallel planes disposed perpendicularly to the longitudinal axis of member 20. Passageway 68 terminates at faces 72 and presents an opening 74 at each face 72. The intersections 76 of faces 72 with the outer cylindrical surfaces 78 of end portions 66 are preferably rounded. Conduit member 20 should preferably be fabricated from a compressible resilient material, typically rubber with a hardness measured on the Shore A scale between the values of approximately 35 to 90 is desirable, the preferred value being about 70.

The outside diameter of cylindrical end portions 66 of member 20 should generally be equal to the diameter of cylindrical cavity 44 of base 14. Thus, cavity 44 is configured to complementally receive member 20 therein with openings 74 in faces 72 of conduit member 20 in alignment with holes 33 and 41 of flanges 30 and 38 respectively.

The length of conduit member 20 should initially be slightly greater than the distance between surfaces 31 and 39 of flanges 30 and 38 whereby the rubbery properties of member 20 provide for the compression, in an axial direction, of member 20 during its insertion into the space between surfaces 31 and 39. This compression acts to retain member 20 between flanges 30 and 38 by resiliently urging planar end faces 72 of member 20 into tight frictional engagement with surfaces 31 and 39 of flanges 30 and 38.

Central portion 70 of member 20 which has the aforementioned outside diameter smaller than the inside diameter of the cylindrical cavity 44 of base structure 14, may preferably be made in such a manner that its diameter is not less than one-half the length of connecting member 20, whereby the tendency of member 20 to buckle or collapse, as does a column, is strictly avoided.

Additionally, the outer cylindrical surface of central portion 70 of connecting member 20, being smaller in diameter than central cavity 44 of base structure 14, permits enlargement of the diameter of central portion 70 resulting from the axial compression of connecting member 20 during and after the installation of the latter between surfaces 31 and 39, said compressive forces being established by virtue of the rubbery properties of member 20. The cylindrical space remaining between the outer cylindrical surface of central portion 70 of connecting member 20 and the cylindrical surface of cavity 44 of base structure 14 is accessible for the removal of detritus collected in said space by use of a suitable instrument from which gas, air, or liquid-cleaning agent is ejected with sufficient force and with a jet of suitable shape and smallness of dimensions.

The aforementioned rounded edges 76 at the ends of connecting member 20, working in conjunction with similarly rounded edges 80 of flanges 30 and 38 allow for the gradual application of the necessary axial compression force to connecting member 20 during the installation of member 20 into cavity 44 of base structure 14 without difficulty of the interference of the sharp edges that would otherwise result.

One application for use of fluid connecting device 10 includes the passage of blood therethrough. For this purpose, the inside diameter of passageway 68 of connecting member 20 is preferably equal to the inside diameter of holes 33 and 41. Thus, since flanges 30 and 38 are coaxially aligned relative to cavity 44 of base structure 14 by bosses 48 and since cavity 44 is cylindrical and has a diameter equal to the outside diameter of connecting member 20, manifestly, member 20 is aligned and properly positioned relative to cavity 44. Accordingly, by geometry, inlet flange 30 is aligned with connecting member 20 which is in turn aligned with outlet flange 38, all such alignments being of sufficient accuracy that openings 74 and holes 33 and 41 are, at each interface, sufficiently smooth and free of discontinuity or protuberances into the lumen of said holes, to prevent the occurrence of clotting of the blood, or turbulence of flowing fluid when the device is used for other fluids which may or may not react unfavorably to said turbulence. Thus, cavity 44 comprises means engaging member 20 and positioning the same in the space between surfaces 31 and 39 with faces 72 engaging surfaces 31 and 39 and with holes 33 and 41 disposed in fluid communication with openings 74.

Diverting member 22 comprises an elongated cylindrical body of the same general dimensions and shape as connecting member 20. Diverting member 22 may be constructed of the same or different materials as member 20 and may be fabricated by any of the methods used for the fabrication of connecting member 20. However, diverting member 22 does not have a straight through passageway but rather is provided with diverting branch passageways 82 and 84. Branch passageway 82 presents an opening 86 in face 88 of member 22 and extends into a laterally extending conduit branch 90. Similarly, branch passageway 84 presents an opening 92 in face 94 of member 22 and extends into a laterally extending conduit branch 96.

Opening 86 communicates with inlet flange hole 33 when diverting member 22 is properly positioned in base structure 14. Branch passageway 82 then passes through a smooth bend in such manner as to carry fluid from inlet tube element 12 away from diverting member 22 by means of conduit branch 90. In similar manner, outlet flange hole 41 communicates with opening 92 in diverting member 22 and allows the passage of fluid into outlet tube element 18 from diverting member 22, the latter receiving fluid through conduit branch 96, which like branch 90 provides a smooth bend for diverting branch passageway 84.

Branch passageways 82 and 84 are out of fluid communication, at least within the confines of diverting member 22. The only time branch passageways 82 and 84 would be connected, would be, for example, when conduit branch 90 is connected to some device 98, for example an artificial kidney, which is in turn connected to conduit branch 96 and returns the passing fluid thereinto. Also, it is to be understood that a shunt could be provided by connecting conduit branches 90 and 96 externally of diverting member 22.

FUNCTION OF THE DEVICE

In use, inlet tube element 12 will generally be permanently connected to a source of fluid and likewise outlet tube element 18 will be connected to a receiver of fluid. With connecting conduit member 20 properly positioned in base structure 14, fluid flows from tube element 12 to tube element 18 by means of member 20 without significant increase in impedance to the flow over that which would otherwise result from an unbroken tube of the same internal dimensions as those of device 10. Further, base structure 14 may be anchored and immobilized through the use of extensions 100 at each end thereof which can readily be taped to the arm of the host.

Connecting member 20 is held in proper position by the axial compression therein and by the friction between end faces 72 of connecting member 20 and surfaces 31 and 39 of flanges 20 and 38. Further, central portion 70 of connecting member 20 is exposed, except for the lower portion thereof which is obscured by the fraction of a cylinder formed by cavity 44 of the base structure 14. These two factors, therefore, making possible the removal of connecting member 20 by using only the fingers of one hand (in the case of small devices operating under low-fluid pressure) or with a simple grasping tool (where the device is larger and/or the operating fluid pressure or the axial compressive modulus of connecting member 20 is too high to allow manual removal thereof). If it is desirable to minimize the escape of fluid when connecting member 20 is removed, tube elements 12 and 18 may be clamped to prevent flow if tube elements 12 and 18 are fabricated of flexible materials. On the other hand, flow may be prevented by valves if tube elements 12 and 18 are fabricated of rigid materials.

Having removed connecting member 20, diverting member 22 may be properly positioned in cavity 44 of base structure 14, whereby fluid flows from inlet tube element 12, through diverting member 22 and thence through conduit branch 90, whereupon the emanating fluid may be treated, modified, transported, or otherwise diverted for various purposes. Thereafter the fluid may be discarded or returned to diverting member 22 by flowing into conduit branch 96, then into the body of diverting member 22, and then through outlet tube element 18 thereby completing the fluid diversion circuit.

When specifically used for diverting blood to an artificial kidney 98, inlet tube element 12 may be permanently connected to an artery and outlet tube element 18 may be permanently connected to a vein. Thus, when connecting member 20 is properly positioned, blood passes from the artery to the vein through the fluid circuit presented by the parts of the fluid connecting device. Connection of the blood circuit to the artificial kidney is accomplished by clamping tube elements 12 and 18 at locations midway between S-bends 28 and 36 thereof and base structure 14. Then, connecting member 20 is removed using the fingers of one hand. Thereafter, using the same fingers, diverting member 22 may be properly positioned in base structure 14. Generally, the conduit branches 90 and 96 of diverting member 22 will have previously been connected to the desired fluid couplings of the artificial kidney 98, thereby affecting, when the clamps are removed, the flow of blood from the artery, through diverting member 22 to and through the artificial kidney 98, then back through diverting member 22 and into the vein, in that order. Thereafter, the tube elements 12 and 18 are again clamped, diverting member 22 removed, and connecting member 20 properly repositioned in base structure 14, thereby affecting the disconnection of the blood circuit from the circuit of artificial kidney 98.

A second diverting member 22 may be provided with hypodermic syringes 102 containing anticoagulant which, when diverting member 22 is properly positioned, may provided for the injection of anticoagulant into the artery and vein in such cases where the blood tends to coagulate rapidly. Protective cover 16 should be reinstalled after connecting member 20 is properly repositioned to minimize contamination and to prevent accidental dislodgement of the connecting insert.

Among the various advantages of the present invention are the following:

1. Only one moving part is required to complete the fluid circuit.

2. Only one moving part is required to divert fluid in such manner that the fluid may flow some distance to another place where the fluid may undergo treatment, disposal, dilution, heating, cooling, purification, or other desirable operations, and then return to the location of the source of the fluid.

3. No mechanical mechanisms other than the axial compression of the fluid circuit conduit members 20 and 22 and the static friction resulting from said compression is required for retention of the members.

4. Protective cover 16 prevents dislodgement of connecting member 20 and minimizes ingress of detritus.

5. The reduced diameter of the central cylindrical portion 70 of members 20 and 22 allows for the removal of detritus disposed between portion 70 and cavity 44 of base structure 14.

6. All operations, including the removal and installation of protective cover 16, removal and installation of connecting member 20 and removal and installation of diverting member 22, are amenable to performance using the fingers of only one hand.

7. All materials with which the flowing fluid comes in contact may be one and the same, may be chemically or abrasion resistant and may be selected to prevent the establishment of galvanic corrosion currents.

8. Connecting member 20 and diverting member 22 may easily be replaced if they become defective, the replacement operation being performed without moving or otherwise disturbing other parts of the device.

9. The device, as used specifically as a means to make fluid connection of the circulatory system of an animal to the artificial kidney, permits the connection to be made in a shorter time than required to make the same connection when fluid connecting devices of other designs are used.

10. The fluid connecting device, when used to connect the circulatory system of the human artificial kidney patient to an artificial kidney, permits the patient to connect and disconnect the system while using only one hand, and without using tools of any kind, this not being possible when other devices of differing designs are used.

11. When the fluid connecting device is used for the flow of blood, and when the fluid-connecting members of the device are fabricated of a transparent material, examples of such materials being silicone rubber and segmented polyurethane rubber, the flowing blood may be observed everywhere in the circuit except those positions that lie interior to the skin and those portions that lie immediately under the bosses 48 and 50 of the base structure 14.

12. The diverting member 22, when equipped with suitable injecting devices 102, may be installed in the device and used to inject substances into either or both of the tube elements 12 and 18 of the device.

The present invention provides a safety connecting device of extreme utility in connection with hemodialysis operations and the like. Among the various practical features provided by the invention is that no forces are applied, either during opening or closing of the connector, they are not cancelled out within the device itself. Thus, no net forces are transmitted to or through the tube elements of the connector device. Moreover, the nature of the device is such that it cannot be accidentally opened and it cannot be prevented from closing. All parts of the device are easily examined and replaced. The device provides for the occlusion of both the arterial and venous lumen of the cannula adjacent thereto. Further, the device provides a blood flow lumen that is free of blood turbulence caused by protuberances and the like. The lumen of the device may be constructed of materials which are compatible with blood. The configuration of the device facilitates the escape of entrapped air bubbles and permits complete and easy prophylaxis.

We claim:

1. A fluid connecting device comprising:

a pair of elongated tube elements each having a positioning flange at one end and means at the opposite end for facilitating connection of the element to a remote liquid flow system, each of said flanges having a generally planar surface facing away from its corresponding tube element, there being a hole in each surface extending inwardly through the flange and communicating with the interior of the tube element;

an elongated base structure rigidly mounting said flanges with said surfaces disposed in spaced, facing, generally parallel relationship presenting an elongated space extending therebetween; and an elongated conduit member disposed in said space and having a pair of opposed, generally planar, generally parallel faces, one at each end thereof, said member including fluid passageway defining means presenting an opening at each of said faces, said base structure including means engaging said conduit member and positioning the same in said space with said faces each engaging a corresponding surface and with said openings each disposed in fluid communication with a corresponding hole, said member being constructed with said faces initially spaced apart a distance slightly greater than the length of said space, said member being longitudinally compressible and resilient whereby said faces are resiliently urged into tight frictional engagement with corresponding surfaces.

2. A device as set forth in claim 1 wherein said passageway defining means defines a single passageway extending through said member and intercommunicating said openings.

3. A device as set forth in claim 1 wherein said member includes a pair of laterally extending conduit branches, said passageway defining means defining a separate branch passageway for each opening, each branch passageway connecting its opening with a respective one of said conduit branches, said branch passageways being out of fluid communication internally of the member.

4. A fluid connecting device as set forth in claim 1 wherein said conduit member is generally cylindrically shaped and wherein said means engaging said conduit member defines a cylindrically shaped cavity configured to complementally receive said member therewithin.

5. A fluid connecting device as set forth in claim 4 wherein the end portions of the member adjacent said faces are larger in diameter than the central portion thereof.

6. A fluid connecting device as set forth in claim 1 wherein the lateral edges of said faces and said surfaces are rounded to facilitate compressing of the member during insertion thereof into said space between the surfaces of the flanges.

7. A fluid connecting device as set forth in claim 4 wherein said conduit member is circular in cross-sectional configuration, the cross-sectional configuration of said cavity comprising a segment of a circle of approximately equal diameter, said openings being concentric with said member and said holes being concentric with said cavity.

8. A fluid connecting device as set forth in claim 1 wherein is included an extension at each end of said base structure to facilitate immobilization of said structure relative to a host therefor.

9. A device as set forth in claim 1 wherein said base structure includes a boss for each tube element, said bosses being substantially coextensive in size with said flanges, said tube elements extending through said bosses with said flanges abutting the bosses.

10. A device as set forth in claim 1 wherein is included a cover for said member, said cover being snappingly engageable with said base structure into surrounding relationship relative to said conduit member.

11. A device as set forth in claim 1 and a second conduit member interchangeable with said first-mentioned conduit member, the passageway defining means of one of said members defining a single passageway extending through said one member and intercommunicating its openings, the second of said members including a pair of laterally extending conduit branches, the passageway defining means of said second member defining a separate passageway for each opening thereof, each of the passageways of the second member connecting its opening with a respective one of said branches, the passageways of said second member being out of fluid communication internally of said second member.

* * * * *